United States Patent
Singh

(10) Patent No.: US 9,754,044 B2
(45) Date of Patent: *Sep. 5, 2017

(54) SYSTEM AND METHOD FOR TRAIL IDENTIFICATION WITH SEARCH RESULTS

(71) Applicant: Excalibur IP, LLC, New York, NY (US)

(72) Inventor: Vik Singh, Palo Alto, CA (US)

(73) Assignee: Excalibur IP, LLC, New York, NY (US)

(*) Notice: Subject to any disclaimer, the term of this patent is extended or adjusted under 35 U.S.C. 154(b) by 144 days.

This patent is subject to a terminal disclaimer.

(21) Appl. No.: 14/036,302

(22) Filed: Sep. 25, 2013

(65) Prior Publication Data

US 2014/0040234 A1 Feb. 6, 2014

Related U.S. Application Data

(63) Continuation of application No. 12/103,527, filed on Apr. 15, 2008, now Pat. No. 8,589,395.

(51) Int. Cl.
*G06F 17/30* (2006.01)

(52) U.S. Cl.
CPC .. *G06F 17/30899* (2013.01); *G06F 17/30864* (2013.01)

(58) Field of Classification Search
CPC .............. G06F 17/30699; G06F 17/30864
See application file for complete search history.

(56) References Cited

U.S. PATENT DOCUMENTS

| | | | |
|---|---|---|---|
| 6,321,228 B1 | 11/2001 | Crandall et al. | |
| 6,631,372 B1* | 10/2003 | Graham | G06F 17/30864 705/26.8 |
| 6,684,205 B1* | 1/2004 | Modha | G06F 17/30864 |
| 7,240,045 B1* | 7/2007 | Bushee | |
| 7,809,801 B1 | 10/2010 | Wang et al. | 709/217 |
| 7,979,301 B1* | 7/2011 | Franco | G06Q 30/0202 705/7.31 |
| 8,386,509 B1* | 2/2013 | Scofield | G06F 17/30699 707/706 |
| 2002/0124075 A1* | 9/2002 | Venkatesan | G06F 17/30902 709/224 |
| 2002/0143802 A1* | 10/2002 | Chi | G06F 17/30864 |
| 2003/0018665 A1* | 1/2003 | Dovin | G06F 17/30876 715/240 |
| 2003/0110181 A1 | 6/2003 | Schuetze et al. | 707/103 R |
| 2003/0144989 A1 | 7/2003 | Schoemann | 707/1 |
| 2005/0120114 A1 | 6/2005 | Nadamoto et al. | 709/225 |
| 2005/0203878 A1 | 9/2005 | Brill et al. | |

(Continued)

OTHER PUBLICATIONS

Walmart—Yahoo! Search Results, http://search.yahoo.com/search on Mar. 12, 2008.

(Continued)

*Primary Examiner* — Tarek Chbouki
(74) *Attorney, Agent, or Firm* — Brinks Gilson & Lione

(57) ABSTRACT

A system and method are disclosed for identifying and generating a potential user trail. The trail may be an anticipated browsing path for a user based on current and/or historical browsing data, including search logs, browsing histories, and other data. The trail may be displayed as a search result summary or with individual search results in response to receiving a search query.

20 Claims, 7 Drawing Sheets

(56) References Cited

U.S. PATENT DOCUMENTS

| | | | |
|---|---|---|---|
| 2006/0294068 A1 | 12/2006 | Li et al. | 707/3 |
| 2007/0016543 A1 | 1/2007 | Epling et al. | |
| 2007/0271230 A1 | 11/2007 | Hart et al. | |
| 2008/0028067 A1* | 1/2008 | Berkhin et al. | 709/224 |
| 2008/0040314 A1 | 2/2008 | Brave et al. | 707/2 |
| 2009/0030876 A1 | 1/2009 | Hamilton | 707/3 |
| 2009/0164920 A1 | 6/2009 | Stelle | 715/760 |
| 2012/0036119 A1* | 2/2012 | Zwicky | G06F 17/30867 707/711 |

OTHER PUBLICATIONS

Yahoo Quick Links : The Official Word, search engine land, http://searchengineland.com on Mar. 12, 2008.
Yahoo Search Blog : Going deeper into the Wikipedia, http://ysearchblog.com/archives on Mar. 12, 2008.
PCT Written Opinion of the International Search Authority and Search Report dated Nov. 13, 2009, PCT/US2009/039096.
First Chinese Office Action, May 14, 2012, Application No. 200980113376.0, Serial No. 2012050901151360, Yahoo! Inc., 15 pages.

* cited by examiner

SYSTEM AND METHOD FOR TRAIL IDENTIFICATION WITH SEARCH RESULTS

PRIORITY STATEMENT

This application claims the benefit of U.S. patent application Ser. No. 12/103,527, filed on Apr. 15, 2008, the disclosure of which is incorporated herein in its entirety by reference.

BACKGROUND

Online searching and advertising may be an important source of revenue for enterprises engaged in electronic commerce. Processes associated with technologies such as Hypertext Markup Language (HTML) and Hypertext Transfer Protocol (HTTP) enable a web page to be configured to display search results and/or advertisements. Online searching is a way for consumers to locate information, goods, or services on the Internet. A consumer may use an online search engine to type in one or more keywords (also referred to as a search term or search query) to search for pages or web sites with information related to the keyword(s). The search results that are shown on the search engine page include links to pages or sites with content that is related to the keyword(s). The search results that are provided to a user may or may not include the information that the user is searching for. Because online advertising may be influenced by the ability of a search engine to provide the most relevant results, the search engine may attempt to provide a user with the information and pages that are most relevant to that user based on the query.

BRIEF DESCRIPTION OF THE DRAWINGS

The system and method may be better understood with reference to the following drawings and description. Non-limiting and non-exhaustive embodiments are described with reference to the following drawings. The components in the drawings are not necessarily to scale, emphasis instead being placed upon illustrating the principles of the invention. In the drawings, like referenced numerals designate corresponding parts throughout the different views.

DETAILED DESCRIPTION

By way of introduction, a system and method for identifying and generating a potential user trail is described. The trail may be an anticipated browsing path for a user based on a search query, e.g. a suggested or anticipated sequence of links or URL's which the user may select, in order, to view a sequence of associated web pages. The trail may also be determined based on current and/or historical browsing data including search logs, browsing histories, and other data. The trail may be displayed as a search result summary and/or in association with individual search results in response to receiving a search query. Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims. Nothing in this section should be taken as a limitation on those claims. Further aspects and advantages are discussed below.

Figure 1:
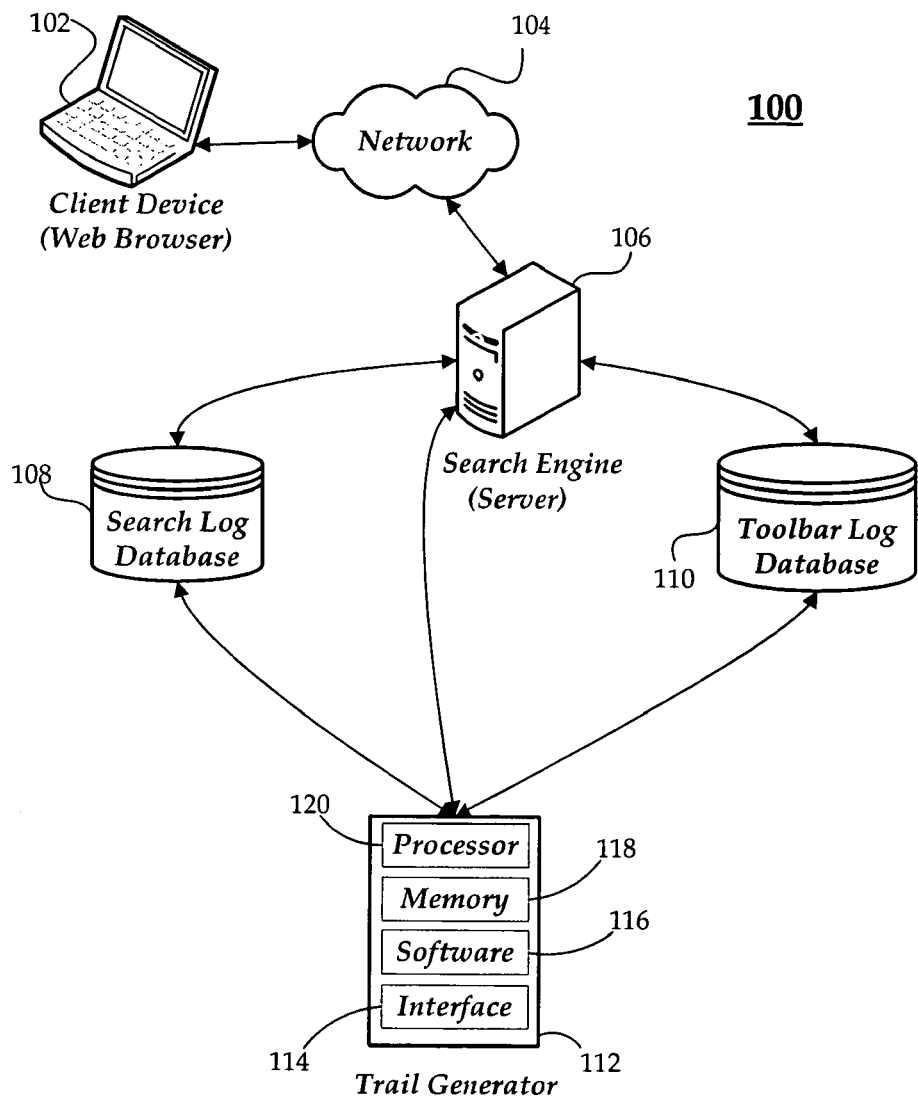
FIG. 1 is a diagram of an exemplary network system.

FIG. 1 provides a simplified view of a network system 100 in which the present system and methods may be implemented. Not all of the depicted components may be required, however, and some systems may include additional, different, or fewer components not shown in the figure may be provided. Variations in the arrangement and type of the components may be made without departing from the spirit or scope of the claims as set forth herein.

FIG. 1 is a block diagram illustrating an exemplary network system 100 for trail identification and analysis. In particular, system 100 includes a trail generator 112 that may receive a search query from a search engine 106 and generate a trail for that search query based on data from a search log database 108 and/or toolbar log database 110. A client device 102 is coupled with the search engine 106 through the network 104 for requesting a search query. The search engine 106 is coupled with the search log database 108, the toolbar log database 110, and/or the trail generator 112. Herein, the phrase "coupled with" may mean directly connected to or indirectly connected through one or more intermediate components. Such intermediate components may include both hardware and software based components. Variations in the arrangement and type of the components may be made without departing from the spirit or scope of the claims as set forth herein.

The client device 102 may be a computing device which allows a user to connect to the network 104, such as the Internet. Examples of a user device include but are not limited to a personal computer, personal digital assistant ("PDA"), cellular phone, or other wired or wireless electronic device. The client device 102 may be configured to access other data/information, in addition to web pages, over the network 104 with a web browser, such as INTERNET EXPLORER or FIREFOX. The client device 102 may enable a user to view pages over the network 104, such as the Internet.

The client device 102 may be configured to allow a user to interact with the search engine 106, trail generator 112, or other components of the system 100. The client device 102 may receive and display a site or page provided by the search engine 106, such as a search page or a page including search results. The client device 102 may include a keyboard, keypad or a cursor control device, such as a mouse, or a joystick, touch screen display, remote control or any other device operative to allow a user to interact with the page(s) provided by the search engine 106.

The search engine 106 is coupled with the client device 102 through the network 104, as well as being coupled with the trail generator 112, search log database 108, and/or the toolbar log database 110. The search engine 106 may be a web server or provided thereby. The search engine 106 may provide a site or a page which is available over a network, such as the network 104 or the Internet. A site or page may refer to a web page or web pages that may be received or viewed over a network. The site or page is not limited to a web page, and may include any information accessible over a network that may be displayed at the client device 102. A site may refer to a series of pages which are linked by a site map or otherwise associated. For example, the web site of www.yahoo.com (operated by Yahoo! Inc., in Sunnyvale, Calif.) may include thousands of pages, which are included at yahoo.com. Hereinafter, a page will be described as a web page, a web site, or any other site/page accessible over a network. A user of the client device 102 may access a page provided by the search engine 106 over the network 104. As described below, the page provided by the search engine 106 may be a search page operable to receive a search query from the client device 102 and causes the provision of search results that are based on the received search query, such as via one or more search result pages, and may further cause the provision of advertisements associated with the search query.

The search engine 106 may include an interface, such as a web page, e.g., the web page which may be accessed on the World Wide Web at yahoo.com, which is used to search for other pages which are accessible via the network 104. The client device 102, autonomously or at the direction of the user, may input a search query (also referred to as a user query, original query, search term or a search keyword) to the search engine 106 via the interface. A single search query may include multiple words or phrases. The search engine 106 may perform a search for the search query and display the results of the search on the client device 102. The results of a search may include a listing of related pages or sites that is provided by the search engine 106 in response to receiving the search query.

In an alternative system, an ad server (not shown) may be coupled with the search engine 106 and/or the trail generator 112. The ad server may be configured to provide advertisements to the search engine 106. Alternatively, the search engine 106 and the ad server may be a common component and/or the search engine 106 may select and provide advertisements. The ad server may include or be coupled with an advertisement database that includes advertisements that are available to be displayed by the search engine 106 for sponsored searching. In addition, the advertisements may be associated with one or more search keywords or queries. The search keywords may be purchased or bid on by advertisers. Accordingly, when that search keyword or a related query is searched for, the advertisers who placed bids are placed in competition for display of their advertisements. The rank order of the advertisements may be determined by various factors, some of which may include the quality of the ad as well as the amount the advertiser bidded.

The search log database 108 includes records or logs of at least a subset of the search queries entered in the search engine 106 over a period of time and may also be referred to as a search query log, search term database, keyword database or query database. The search log database 108 may store the search keywords that are used by the ad server 108 in selecting an advertisement for a particular search query. The search log database 108 may include search queries from any number of users over any period of time. The queries stored in the search log database 108 may include relevant browsing trails that are associated with the queries.

Figure 2:
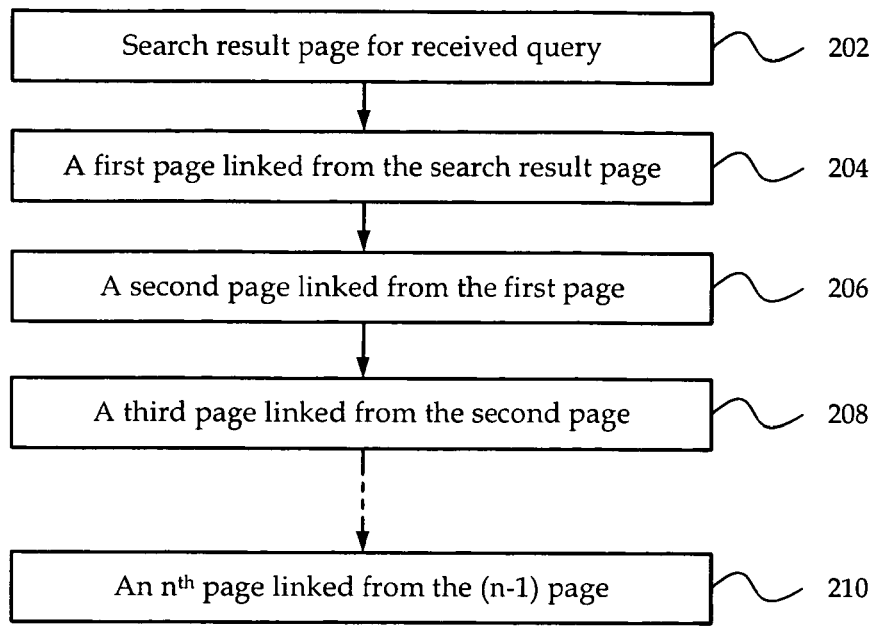
FIG. 2 is an illustration of an exemplary browsing trail.

FIG. 2 is an exemplary browsing trail 200. The browsing trail 200 may include a sequence of pages or web sites that a user may follow. The trail may also be referred to as a path or track and may include a list of items that a user views or selects. The items may be pages, such as web pages that a user views or may refer to particular products, services, or advertisements that are identified in the trail. Alternatively, the trail may include pages that identify the products, services, or advertisements. The trail may include a list of universal resource locators (URL) of pages that the user has visited in succession. Each item in the list may be linked by a previous item in the list. The list of items may be referred to as bread crumbs. Bread crumbs may provide links back to each previous page that the user navigated through in order to get to the current page, which for hierarchical structures may be the parent pages of the current page. Bread crumbs may provide a trail for a user to follow back to a starting/entry point of a website.

The trail 200 may originate with a search query and the trail is a record or list of destinations that a user may take following the search. In block 202, a search query is received and a search result page is displayed that includes at least one search result. The search result page and/or individual search results may include links on those pages that users may select. For example, a particular ad that is displayed with the search results may be popular and may be an item that is selected within a browsing trail. Alternatively, a selection of one of the search results from the search result page may be a first item in a trail as in block 204. From that page, there may be additional links to a second page that may represent the next item in a trail as in block 206. Likewise, there may be additional links to a third page that may represent the next item in a trail as in block 208. The trail may include a list of pages that the user has clicked on that may include n items as in block 210. Alternatively, the additional links (second page) may not be linked from the first page.

The trail may include a potential browsing session of a user and the pages that the user may view. A browsing session may include multiple trails. For example, the user may have a trail that includes searching for and reviewing digital cameras. That user may also have another trail that includes searching for and selecting tickets for a baseball game. The trail may begin with a received search query and a subsequent search results page as in FIG. 2. The pages that a user views related to that query may be considered as a trail for that query. As described, a trail may be identified and predicted for a user based on a received query and additional data or factors.

The toolbar log database 110 includes records or logs of at least a subset of the browsing history of one or more users over a period of time and may also be referred to as a toolbar log, browsing database, or browsing log. The client device 102 may include a tracking or monitoring mechanism that records a browsing history of the user of the client device 102. In one system, the tracking/monitoring mechanism may be a search toolbar that is installed with a web browser on the client device 102. The toolbar may allow a user to opt-in to provide usage statistics that may be stored in the toolbar log database 110. The usage statistics may include a search history and a browsing history. The statistics may include trails that the user has explored an may be used to identify common trails that a user may perform. In one example, the trail that a user follows after submitting a query may be recorded in the toolbar log database 110.

The search log database 108 or the toolbar log database 110 may also be coupled with a unit dictionary (not shown). The unit dictionary may be a database of user queries or search keywords that are coupled with one another as units. Units may also be referred to as concepts or topics and are sequences of one or more words that appear in search queries. For example, the search query "New York City law enforcement" may include two units, e.g. "New York City" may be one unit and "law enforcement" may be another unit. A unit is a phrase of common words that identify a single concept. As another example, the search query "Chicago art museums" may include two units, e.g. "Chicago" and "art museums." The "Chicago" unit is a single word, and "art museums" is a two-word unit. Units identify common groups of keywords to maximize the efficiency and relevance of search results. The unit dictionary and the categorization of search queries into units may be used to analyze queries received by the search engine 106. A search query may be broken into units that are used to analyze search history for identifying and generating trails. Categorization of search queries into units is discussed in commonly owned U.S. Pat. No. 7,051,023 issued May 23, 2006, entitled "SYSTEMS AND METHODS FOR GENERATING CONCEPT UNITS FROM SEARCH QUERIES," which is hereby incorporated by reference.

The trail generator 112 may be a computing device for analyzing and identifying a trail based on a search query and additional data and/or factors. The search engine 102, the search log database 108, and/or the toolbar log database 108 may be coupled with the trail generator 112. The trail generator 112 may receive a user query from the client device 102 and/or the search engine 106 and identify a potential trail based on an analysis of that user query.

The trail generator 112 includes a processor 120, memory 118, software 116 and an interface 114. The trail generator 112 may be a separate component from the search engine 106, or may be combined as a single component or device. The interface 114 may communicate with any of the client device 102, the search engine 106, the search log database 108, and/or the toolbar log database 110. The interface 114 may include a user interface configured to allow a user to interact with any of the components of the trail generator 112. For example, a user may be able to edit, add or remove items from a trail or update usage statistics that are used by the trail generator 112.

The processor 120 in the trail generator 112 may include a central processing unit (CPU), a graphics processing unit (GPU), a digital signal processor (DSP) or other type of processing device. The processor 120 may be a component in any one of a variety of systems. For example, the processor 120 may be part of a standard personal computer or a workstation. The processor 120 may be one or more general processors, digital signal processors, application specific integrated circuits, field programmable gate arrays, servers, networks, digital circuits, analog circuits, combinations thereof, or other now known or later developed devices for analyzing and processing data. The processor 120 may operate in conjunction with a software program, such as code generated manually (i.e., programmed).

The processor 120 may be coupled with a memory 118, or the memory 118 may be a separate component. The interface 114 and/or the software 116 may be stored in the memory 118. The memory 118 may include, but is not limited to computer readable storage media such as various types of volatile and non-volatile storage media, including to random access memory, read-only memory, programmable read-only memory, electrically programmable read-only memory, electrically erasable read-only memory, flash memory, magnetic tape or disk, optical media and the like. The memory 118 may include a random access memory for the processor 120. Alternatively, the memory 118 may be separate from the processor 120, such as a cache memory of a processor, the system memory, or other memory. The memory 118 may be an external storage device or database for storing recorded image data. Examples include a hard drive, compact disc ("CD"), digital video disc ("DVD"), memory card, memory stick, floppy disc, universal serial bus ("USB") memory device, or any other device operative to store image data. The memory 118 is operable to store instructions executable by the processor 120.

The functions, acts or tasks illustrated in the figures or described herein may be performed by the programmed processor executing the instructions stored in the memory 118. The functions, acts or tasks are independent of the particular type of instruction set, storage media, processor or processing strategy and may be performed by software, hardware, integrated circuits, firm-ware, micro-code and the like, operating alone or in combination. Likewise, processing strategies may include multiprocessing, multitasking, parallel processing and the like. The processor 120 is configured to execute the software 116. The software 116 may include instructions for analyzing and identifying a trail to display based on a received query.

The interface 114 may be a user input device or a display. The interface 114 may include a keyboard, keypad or a cursor control device, such as a mouse, or a joystick, touch screen display, remote control or any other device operative to interact with the trail generator 112. The interface 114 may include a display coupled with the processor 120 and configured to display an output from the processor 120. The display may be a liquid crystal display (LCD), an organic light emitting diode (OLED), a flat panel display, a solid state display, a cathode ray tube (CRT), a projector, a printer or other now known or later developed display device for outputting determined information. The display may act as an interface for the user to see the functioning of the processor 120, or as an interface with the software 116 for providing input parameters. In particular, the interface 114 may allow a user to interact with the trail generator 112 to view or modify the analysis and identification of trails related to user queries.

Any of the components in system 100 may be coupled with one another through a network. For example, the trail generator 112 may be coupled with the search engine 106, search log database 108, or toolbar log database 110 via a network. Any of the components in system 100 may include communication ports configured to connect with a network. The present disclosure contemplates a computer-readable medium that includes instructions or receives and executes instructions responsive to a propagated signal, so that a device connected to a network can communicate voice, video, audio, images or any other data over a network. The instructions may be transmitted or received over the network via a communication port or may be a separate component. The communication port may be created in software or may be a physical connection in hardware. The communication port may be configured to connect with a network, external media, display, or any other components in system 100, or combinations thereof. The connection with the network may be a physical connection, such as a wired Ethernet connection or may be established wirelessly as discussed below. Likewise, the connections with other components of the system 100 may be physical connections or may be established wirelessly.

The network or networks that may connect any of the components in the system 100 to enable communication of data between the devices may include wired networks, wireless networks, or combinations thereof. The wireless network may be a cellular telephone network, a network operating according to a standardized protocol such as IEEE 802.11, 802.16, 802.20, published by the Institute of Electrical and Electronics Engineers, Inc., or a WiMax network. Further, the network(s) may be a public network, such as the Internet, a private network, such as an intranet, or combinations thereof, and may utilize a variety of networking protocols now available or later developed including, but not limited to TCP/IP based networking protocols. The network(s) may include one or more of a local area network (LAN), a wide area network (WAN), a direct connection such as through a Universal Serial Bus (USB) port, and the like, and may include the set of interconnected networks that make up the Internet. The network(s) may include any communication method or employ any form of machine-readable media for communicating information from one device to another. For example, the search engine 106 may provide pages to the client device 102 over a network, such as the network 104.

The search engine 106, the search log database 108, the toolbar log database 110, the trail generator 112 and/or the client device 102 may represent computing devices of various kinds. Such computing devices may generally include any device that is configured to perform computation and that is capable of sending and receiving data communications by way of one or more wired and/or wireless communication interfaces. Such devices may be configured to communicate in accordance with any of a variety of network protocols, as discussed above. For example, the client device 102 may be configured to execute a browser application that employs HTTP to request information, such as a web page, from the search engine 106. The present disclosure contemplates a computer-readable medium that includes instructions or receives and executes instructions responsive to a propagated signal, so that any device connected to a network can communicate voice, video, audio, images or any other data over a network.

Figure 3:
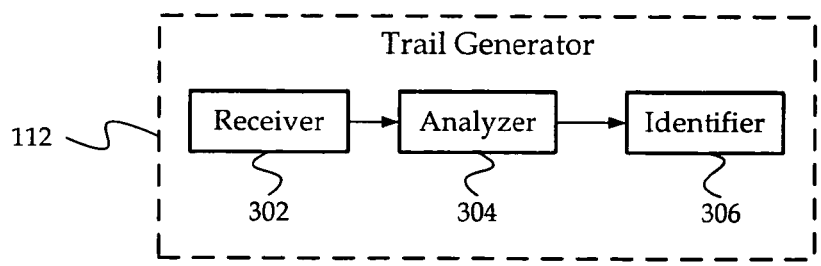
FIG. 3 is a diagram of a trail generator.

FIG. 3 illustrates an exemplary trail generator. As described with respect to FIG. 1, the trail generator 112 may receive a search query and analyze potential browsing trails related to that query and/or the search results. Relevant or popular trails may be displayed with the search results. The trail generator 112 may include a receiver 302, an analyzer 304, and an identifier 306. The trail generator 112 or any of its components may represent computing devices of various kinds. Any of the components illustrated in FIG. 3 may be implemented in the software 116, stored in the memory 118 and executed by the processor 120 as described in FIG. 1.

Figure 4:
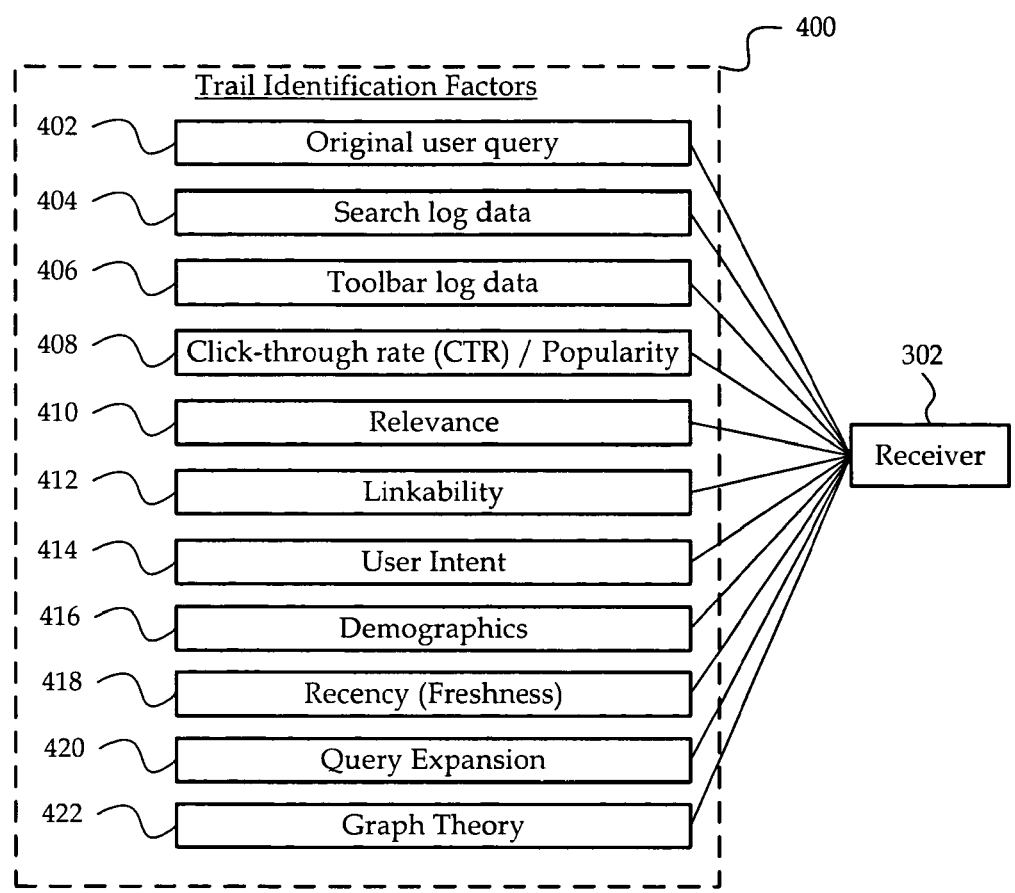
FIG. 4 is a diagram of exemplary trail identification factors.

The receiver 302 may receive a user query from the search engine 106, which may receive the user query from the client device 102. The receiver 302 may also receive information or data that may be used for identifying a trail. The trail and trail information may be analyzed by an analyzer 304. FIG. 4 illustrates trail identification factors 400 that may be received by the receiver 302 and analyzed by the analyzer 304. The trail identification factors 400 may be used to generate a trail in response to a received query. In alternate embodiments, more or fewer factors 400 may be used when identifying and generating a trail.

The original user query 402 is a first trail identification factor. The trail that is generated may be based at least partially on the original user query 402. In addition, the trail may be based on the search results of the original user query 402. Search log data 404 from the search log database 108 may provide historical search data, as well as historical browsing data. Likewise, toolbar log data 406 from the toolbar log database 110 may provide historical search data and/or historical browsing data. The data 404, 406 may be used to identify a relevant trail and may include the other factors 400.

The click through rate (CTR) and/or popularity 408 may be another trail identification factor. Items or links on a page that are more popular may be used to establish a trail. For example, search results for a query may result in users clicking on those results and clicking on links or sites from those search results. The more popular destinations may be identified as a potential trail for that search query. The popularity may be based on clicks measured from the search log data 404 and/or the toolbar log data 406.

Figure 5:
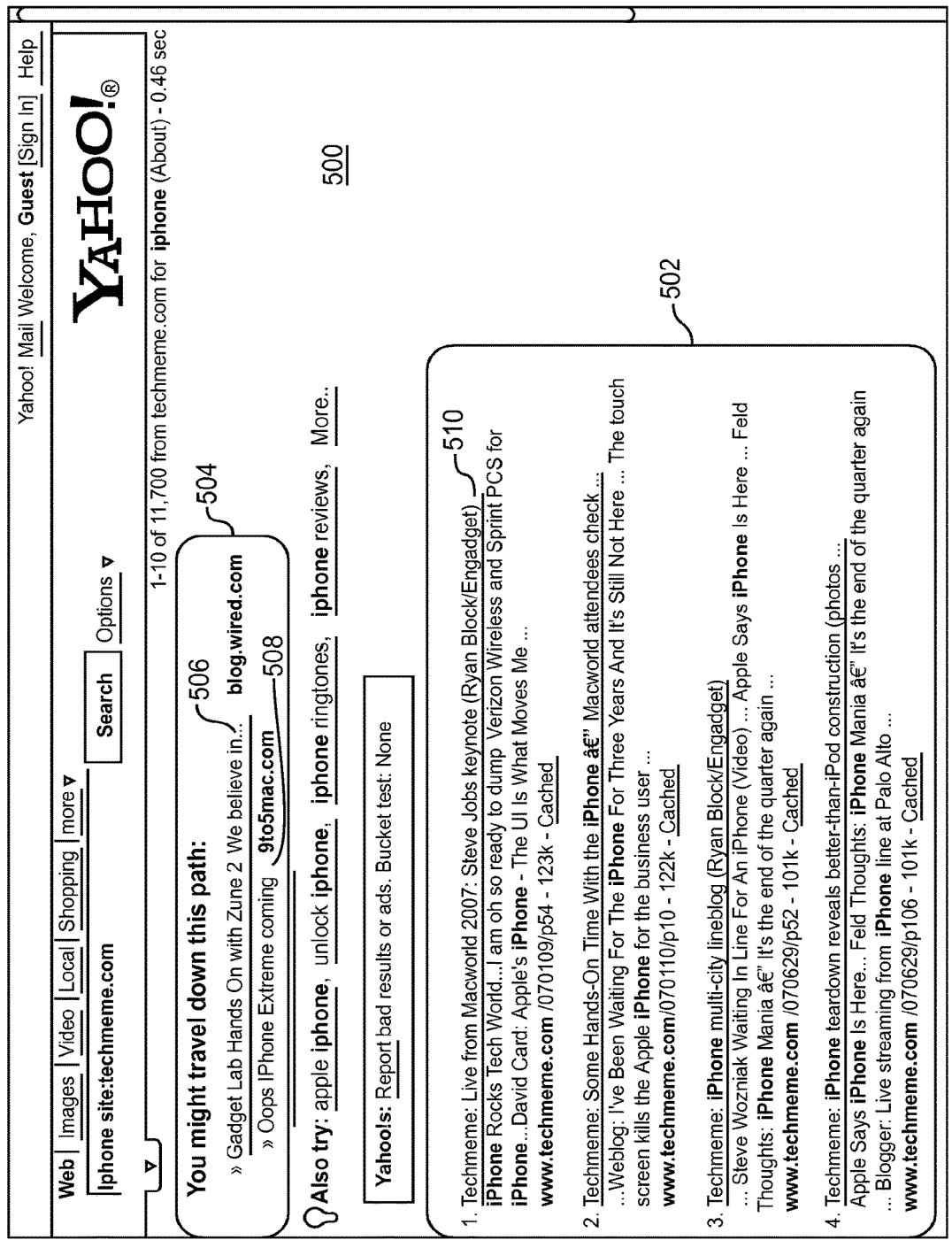
FIG. 5 is an exemplary search screen.

FIG. 5 is an exemplary search screen 500. The search query is for "IPHONE" and the search results 502 are displayed. As shown, the search is limited to the domain site techmeme.com, however, the search can be over any domain and does not need to be limited. The trail 504 may include popular links that previous users have clicked on. Those links may be linked from the pages of the search results. For example, the first trail link 506 is a blog article related to the ZUNE 2 and the second trail link 508 is regarding IPHONE EXTREME. Search/toolbar data may indicate that the first trail link 506 was a popular destination for users who searched for "IPHONE" and clicked through some of the search results. In one example, the first trail link 506 may be a link from within the first search result 510. In other words, users may click to view the first search result 510 and ultimately view a link for the first trail link 506 from the first search result 510 page.

Referring back to FIG. 4, relevance 410 is an additional trail identification factor. The relevance 410 may relate to whether a potential trail is related to the original search query. For example, the search technology that generates the search results may be used to determine whether the potential trail is related to the query. The relation may be based on a comparison of the potential trail with the search results. The relation may be based on a comparison between the query and the search results and potential links. The comparison may include considering the title, summary, URL, and description of the search results.

Linkability 412 and user intent 414 may be additional trail identification factors. Linkability 412 may refer to the amount or frequency that other pages link to a particular site. A site that is frequently linked to may be a better candidate for a trail than a site that is rarely linked to. The user intent 414 may be a measure of what a user or client is searching for with each query. User intent 414 may be determined based on the search query and/or the browsing path of the user after viewing the search results. In addition, user intent 414 may be based on prior search queries or past search data that identifies a common goal of a user based on search queries. User intent 414 is further described in the commonly assigned patent application entitled "SEGMENTATION OF SEARCH TOPICS IN QUERY LOGS" by Kristina Lisa Klinkner & Rosie Jones, U.S. patent application Ser. No. 11/957,150, now U.S. Pat. No. 7,877,839, filed on Dec. 14, 2007, which describes missions and goals that may be the user intent 414 and is hereby incorporated by reference.

The demographics 416 may be a consideration for identifying trails. For example, the location or sex of a user may be a factor in which potential trails are identified. The recency or freshness 418 of a link may be considered as well. It may be beneficial to display links in the trail that are newer or to avoid displaying links to older information or to sites that have not been updated for some time. Further, a trail may be displayed adjacent to the individual search results. For example, a potential trail may be displayed under each of the search results in one example.

The query expansion 420 and graph theory 422 may be further considerations for trail identification. Graph theory 422 may contribute an algorithm, such as breadth first search, for efficiently traversing and discovering website links from a starting webpage. Query expansion 420 may take the user's query, issues it to the search engine, and review the text from the web search results to build a representative document for that query. Traditional Information Retrieval (IR) algorithms may be used to compute a Term Frequency Inverse Document Frequency (TFIDF) weighted bag-of-words term vector from this document. For example, the title, URL, summary, and description of the search results may be used to provide the weighted bag-of-words for a particular search. With this query document, the system may compute the Cosine or Jaccard similarity between the query document and a candidate web document for the trail. This similarity score may represent the relevance of the user's query to a website. Trail selection may maximize the query relevance and the popularity of web links.

Referring back to FIG. 3, the identifier 306 receives the analyzed trail identification factors 400. In particular, the identifier 306 may use the analyzed factors 400 from the analyzer 304 to identify potential trail links. As described, the potential trail links may be displayed with the search results, such as shown in FIG. 5.

Figure 6:
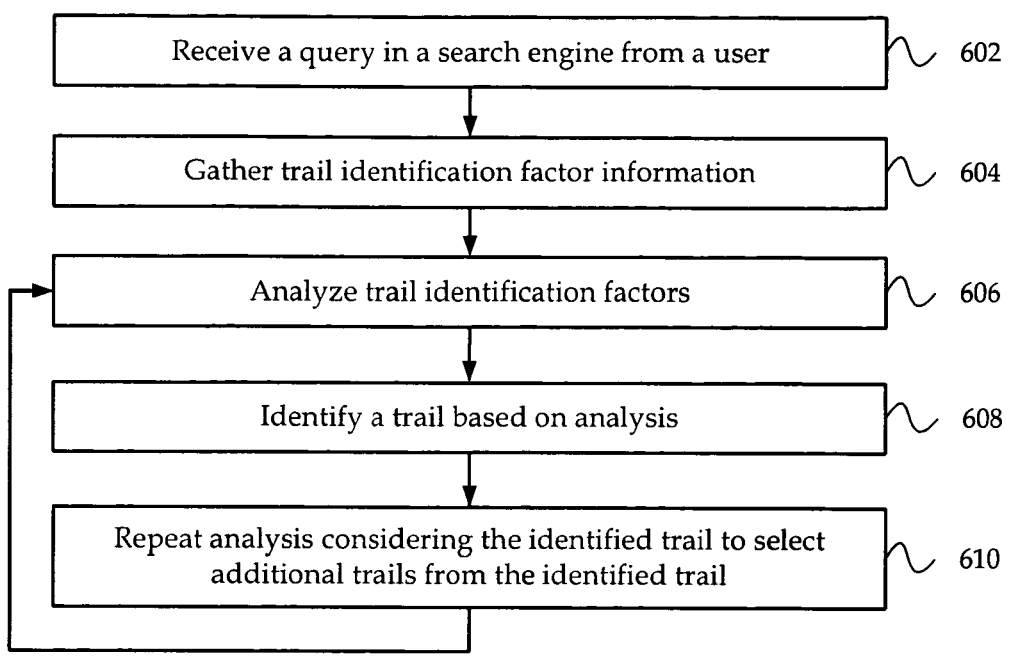
FIG. 6 is a process for identifying a trail.

FIG. 6 is a process for identifying a trail. In block 602, a query is received at the search engine 106 from a user of the client device 102. The query may be transmitted to the receiver 302 of the trail generator 112. Trail identification factor information 400 may be gathered for the analyzer 304 in block 604. The trail identification factors 400 may be analyzed by the analyzer 304 in block 606. Based on the analysis of the factors 400, a trail is identified as in block 608. This trail may then be displayed with the search results. In block 610, the analysis from block 606 may be repeated for the identification of additional trails to be displayed with the search results. A trail may include one or more links that are displayed. In one example, FIG. 5 illustrates a trail with two links; however, more or fewer links may be displayed.

Figure 7:
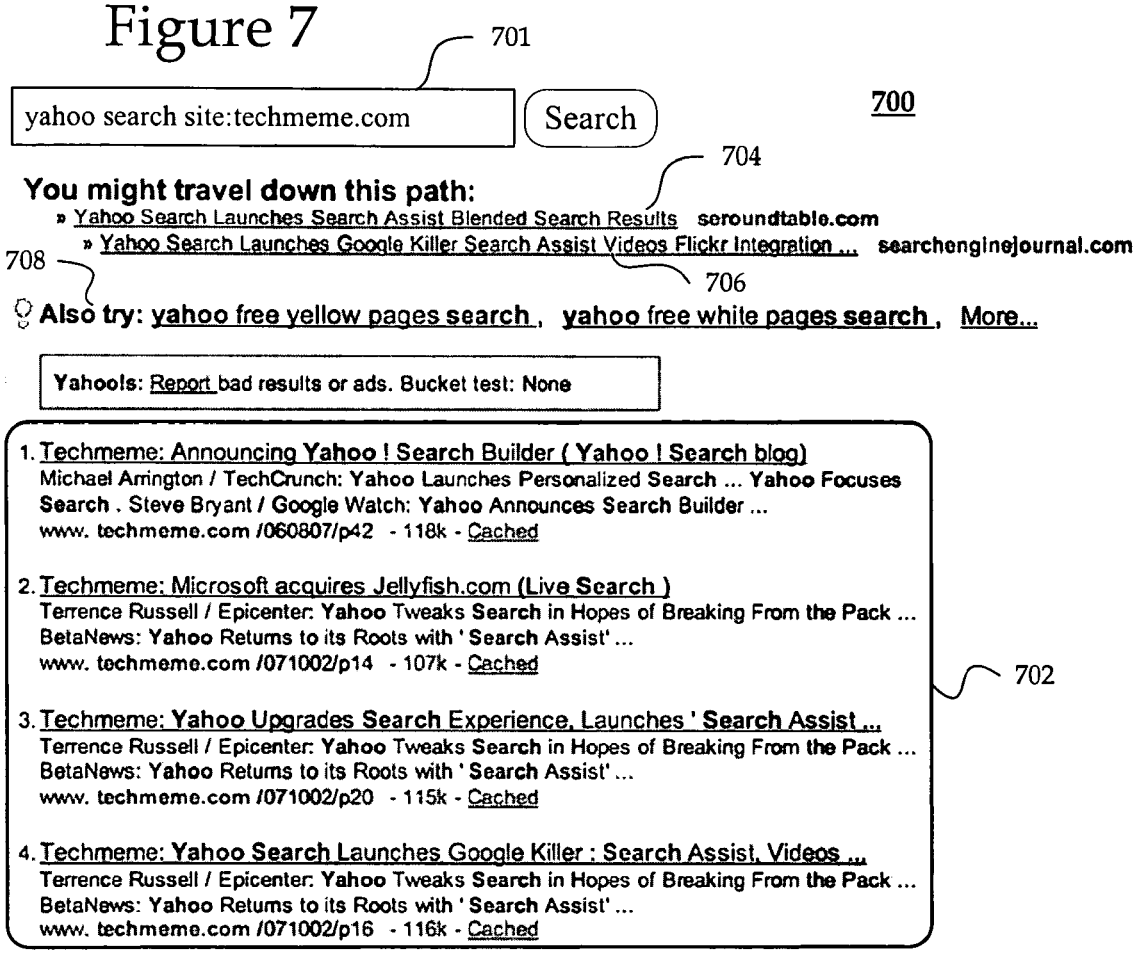
FIG. 7 is another exemplary search screen.

FIG. 7 is another exemplary search screen 700. The screen 700 illustrates a received user query for "yahoo search" in the search query box 701. As shown, the search is limited to the domain site techmeme.com, however, the search can be over any domain and does not need to be limited. The search results 702 illustrate web links relevant to the query. A first and second identified trail 704, 706 may represent potential future paths for the user. The trails 704, 706 may be links from any of the search results 702 that the user may browse to. As described above, the identification of trails may be based on an analysis of factors. In an alternative embodiment, rather than displaying multiple trails, a control box may be displayed that may include a forward or reverse button that allows a user to scroll through potential links/trails that may be relevant. Accordingly, the user can scroll through or view predicted trails using those functions.

In an overlay model embodiment, trails may appear under individual search results. The starting page in the trail may be the search result link under which the trail is displayed. Alternatively, trails may also be displayed in the Yahoo! Search Assistance layer, which may be a drop-down menu that is displayed under the search box. The Search Assistance layer may be referred to as a query suggestions box and may provide a user with a query suggestion or related terms, as well as the suggested trail. The search screen 700 displays additional search recommendations near an also try 708 portion of the screen 700. The also try 708 portion may be replaced with Yahoo! Research Assist, which may provide additional recommendations for users. At least part of the recommendations in Research Assist may include potential trails.

In one embodiment, an exemplary fast forward algorithm for identifying potential trails will be described. The fast forward algorithm attempts to predict future browsing locations of a user, such as the trails 704, 706 from FIG. 7. The fast forward algorithm may be receive two inputs including the original query and a universal resource locator (URL) of a starting page. The starting page may be any of the search result pages based on a search for the query, or may be another page associated with the query. A query expansion may be performed on the query. The query expansion may include retrieving the URL's, abstracts, summaries, and titles from the top results of a web search for the query. A weighted vector may be calculated based on those terms.

Paths may be identified by a function paths=bfs(start_url, branch_factor=10, depth=4, graph_model=path_score, query_model=qe). The bfs function may refer to breadth first search, which is an algorithm for traversing graphs level by level. The traversing may be limited to a branch factor of 10 links and a depth of 4. Query_model=qe may refer to the query expansion of the original query. As one example, For example, the first 10 links from a search result page may be crawled. For example, if the first link is an image, then on the image page the top ten links or results from that page are identified and each are crawled. Alternatively, more or fewer links may be used as the number of search results for a query and the number of links that are crawled. Crawling a link from the image page may represent a third level. The exemplary algorithm may crawl through a depth of four levels. The total links that are crawled are $10^4$ links. These pages may have already been crawled/saved in a table from the web search crawl process. During this traversal, edges of the graph may be collected and scored with the bfs algorithm and saved in an adjacency list structure (table).

An exemplary scoring function may be path_score(prev_url, next_url, qe): return pr_visit(prev_url, next_url)+weight*sim(qe, next_url). Pr_visit may be the probability of clicking next_url from prev_url page. This probability may be determined based on search data, toolbar data, isp logs, or other data. The pr_visit function may use any of the trail identification factors 400 discussed above for determining trail links. Sim may be a function that takes in the query vector and next_url page (which the function converts into a document vector), and computes their similarity. The similarity may be a measure of how relevant is the query to the next_url page. The similarity function may compute the cosine distance (inner product) of the two vectors, and return a score between 0 to 1, where 1 is 100% similar or identical. The two vectors passed to the sim function may correspond to the Term Frequency Inverse Document Frequency (TFIDF) weighted bag-of-words query expanded document vector (qe) and the TFIDF weighted bag-of-words web page document vector (next_url). Weight may be a scaling factor following a decay model, with less emphasis on query relevance as the degree of pages (depth) increases. When the user clicks off a web search result and browses ten pages out, that user may no longer be focusing on the query.

A sort function may determine which paths (trails) may be the highest scoring from the exemplary scoring function. The higher scoring paths may be used as the links for a fast forward trail that is displayed with the search results.

Figure 8:
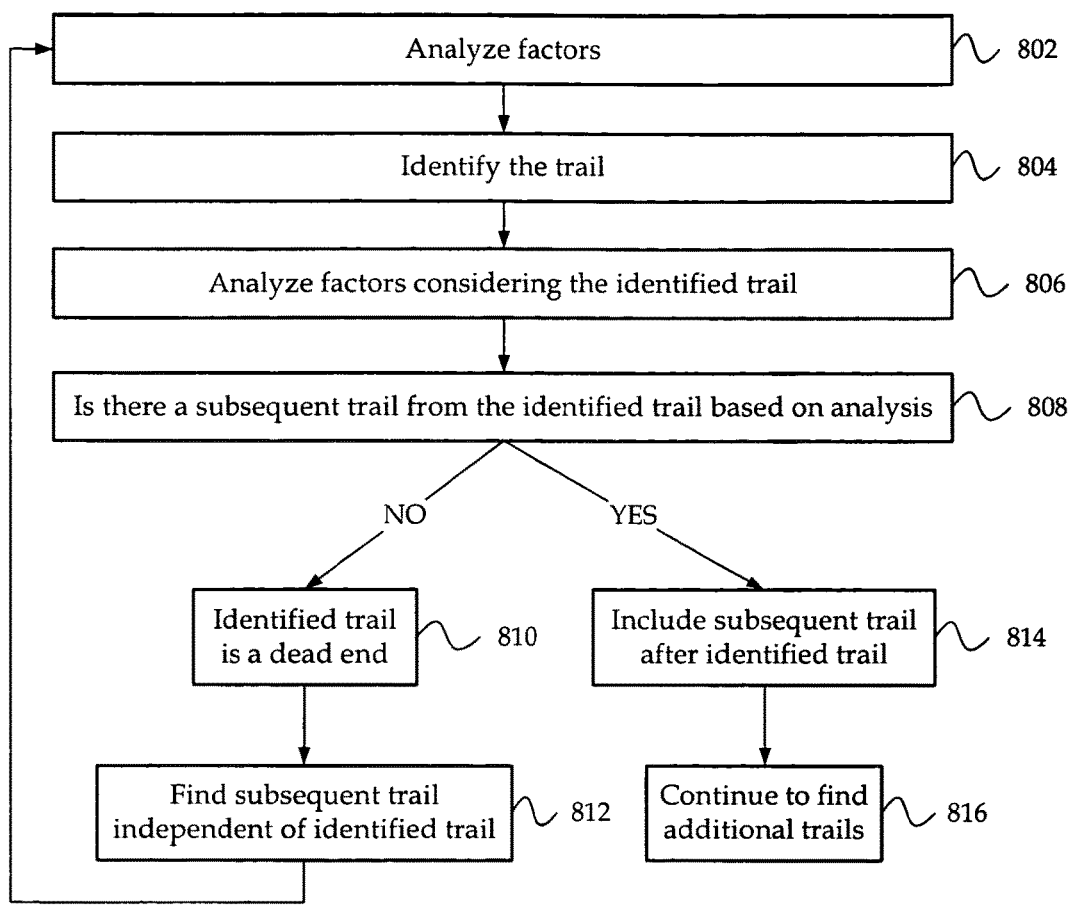
FIG. 8 is a process for producing a trail with multiple links.

FIG. 8 is a process for producing a trail with multiple links. In block 802, the trail identification factors 400 may be analyzed for identifying a first trail link as in block 804. In block 806, the identified first trail link may be used for a subsequent analysis of the factors 400 for identifying a second trail link as in block 808. In particular, if the second trail link is a subsequent trail from the first trail link page as in block 514, then the second trail link may be identified with the first trail link. In block 516, additional trails may be identified in addition to the first and second trail link. The second trail link may be a subsequent page that is reached from the first trail link page. Accordingly, the second trail link may be a common destination from the first trail link. In block 510, the identified first trail link may be a dead end without any further links from that page, in which case, subsequent trails are identified independent of the identified first trail link as in block 512. In other words, the links within a trail may not be related or linked to one another. Alternatively, as in block 514, the trail links are linked from one another. The first trail link may provide a link to the second trail link.

The system and process described may be encoded in a signal bearing medium, a computer readable medium such as a memory, programmed within a device such as one or more integrated circuits, and one or more processors or processed by a controller or a computer. If the methods are performed by software, the software may reside in a memory resident to or interfaced to a storage device, synchronizer, a communication interface, or non-volatile or volatile memory in communication with a transmitter. A circuit or electronic device designed to send data to another location. The memory may include an ordered listing of executable instructions for implementing logical functions. A logical function or any system element described may be implemented through optic circuitry, digital circuitry, through source code, through analog circuitry, through an analog source such as an analog electrical, audio, or video signal or a combination. The software may be embodied in any computer-readable or signal-bearing medium, for use by, or in connection with an instruction executable system, apparatus, or device. Such a system may include a computer-based system, a processor-containing system, or another system that may selectively fetch instructions from an instruction executable system, apparatus, or device that may also execute instructions.

A "computer-readable medium," "machine readable medium," "propagated-signal" medium, and/or "signal-bearing medium" may comprise any device that includes, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical connection "electronic" having one or more wires, a portable magnetic or optical disk, a volatile memory such as a Random Access Memory "RAM", a Read-Only Memory "ROM", an Erasable Programmable Read-Only Memory (EPROM or Flash memory), or an optical fiber. A machine-readable medium may also include a tangible medium upon which software is printed, as the software may be electronically stored as an image or in another format (e.g., through an optical scan), then compiled, and/or interpreted or otherwise processed. The processed medium may then be stored in a computer and/or machine memory.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

I claim:

1. A browsing trail identification system comprising:
at least one non-transitory processor-readable storage medium comprising a set of instructions for directing one or more processors to perform browsing trail identification; and
at least one processor, in communication with the at least one non-transitory processor-readable storage medium, configured to execute the set of instructions to:
receive a search query from a user device;
identify a first potential browsing destination based on the received search query;
search a plurality of links based on the first potential browsing destination, each of the plurality of links being associated with a respective destination;
for each destination, obtain a respective probability that the user will view the destination and a respective similarity between the received search query and the destination, wherein obtaining the respective similarity comprises comparing a vector based upon the received search query with a vector based upon the destination;
based on a path-scoring function that incorporates the respective probability of each destination with the respective similarity of each destination, select a sequence of potential browsing destinations from the plurality of destinations as a browsing trail,
wherein the potential browsing destinations of the sequence are linked with one another from the first potential browsing destination to an end potential browsing destination through at least one intermediate potential browsing destination,
wherein each of the first potential browsing destination and the at least one intermediate potential browsing destination comprises a link connecting to a next potential browsing destination in the sequence; and
provide a link associated with one of the at least one intermediate potential browsing destination to the user device for display by the user device in response to the received search query.

2. The browsing trail identification system of claim 1, wherein each of the end potential browsing destination and the at least one intermediate potential browsing destination comprises a link connecting to a previous potential browsing destination in the sequence.

3. The browsing trail identification system of claim 1, wherein at least one of the plurality of destinations is at least one web page that refers to or identifies at least one of a product, a service, or an advertisement, and
wherein the at least one processor is further configured to determine a result for the search query as the first potential browsing destination of the sequence.

4. The browsing trail identification system of claim 1 wherein to search at least one link of the plurality of links, the at least one processor is further configured to:
search at least one level down from the first potential browsing destination to identify the link, wherein the at least one level down corresponds with a page that can be reached from a search result from the search query.

5. The browsing trail identification system of claim 1, wherein the processor is configured to determine each probability based on at least one of a location of the user, gender of the user, recency of update of the respective destination associated with the respective link, search history of the user, or browsing history of the user.

6. The browsing trail identification system of claim 1, wherein the at least one processor is further configured to perform at least one act of:
providing a forward button and a reverse button configured to allow a user to scroll through the sequence of potential browsing destinations; or
displaying at least one link of the potential browsing destinations in a drop down menu under a search box.

7. The browsing trail identification system of claim 1, wherein incorporating the respective probability of each destination with the respective similarity of each destination comprises weighting the respective similarity of each destination and adding the weighted respective similarity of each destination to the respective probability of each destination.

8. The browsing trail identification system of claim 1, wherein selecting the sequence of potential browsing destinations from the plurality of destinations as the browsing trail comprises including the path-scoring function in a path-identification function, and the path-identification function further includes at least one of:
a uniform resource locator (URL) of the first potential browsing destination;
a branch factor value specifying a number of links for the breadth first search function to crawl;
a depth value specifying a number of levels for the breadth first search function to crawl; or
a query expansion of the search query.

9. A computerized method for browsing trail identification, comprising:
receiving, by a computer, a search query from a user device;
identifying, by a computer, a first potential browsing destination based on the received search query;
searching, by a computer, a plurality of links based on the first potential browsing destination, each of the plurality of links being associated with a respective destination;
for each destination, obtaining, by a computer, a respective probability that the user will view the destination and a respective similarity between the received search query and the destination, wherein obtaining the respective similarity comprises comparing a vector based upon the received search query with a vector based upon the destination;
based on a path-scoring function that incorporates the respective probability of each destination with the respective similarity of each destination, selecting, by a computer, a sequence of potential browsing destinations from the plurality of destinations as a browsing trail,
wherein the potential browsing destinations of the sequence are linked with one another from the first potential browsing destination to an end potential browsing destination through at least one intermediate potential browsing destination,
wherein each potential browsing destination is identified based on the search query and a possibility that the potential browsing destination will be selected by the user; and
providing, by a processor, a link associated with one of the at least one intermediate potential browsing destination to the user device for display by the user device in response to the received search query.

10. The method of claim 9, wherein each of the end potential browsing destination and the at least one intermediate potential browsing destination comprises a link connecting to a previous potential browsing destination in the sequence.

11. The method of claim 9, wherein the at least one of the plurality of destinations is at least one web page that refers to or identifies at least one of a product, a service, or an advertisement, and
the method further comprising:
determining, by a processor, a result for the search query as the first potential browsing destination of the sequence.

12. The method of claim 9, wherein searching of at least one link of the plurality of links comprises:
searching, by a processor, at least one level down from the first potential browsing destination to identify the link, wherein the at least one level down corresponds with a page that can be reached from a search result from the search query.

13. The method of claim 9, wherein each probability is determined based on at least one of a location of the user, gender of the user, recency of update of the respective destination associated with the respective link, search history of the user, and browsing history of the user.

14. The method of claim 9, further comprising at least one of:
providing, by a processor, a forward button and a reverse button configured to allow a user to scroll through the sequence of potential browsing destinations; or
displaying, by a processor, at least one link of the potential browsing destinations in a drop down menu under a search box.

15. The method of claim 9, incorporating the respective probability of each destination with the respective similarity of each destination comprises weighting the respective similarity of each destination and adding the weighted respective similarity of each destination to the respective probability of each destination.

16. The method of claim 9, wherein selecting the sequence of potential browsing destinations from the plurality of destinations as the browsing trail comprises including the path-scoring function in a path-identification function, and the path-identification function further includes at least one of:

a uniform resource locator (URL) of the first potential browsing destination;
a branch factor value specifying a number of links for the breadth first search function to crawl;
a depth value specifying a number of levels for the breadth first search function to crawl; or
a query expansion of the search query.

17. A non-transitory processor-readable storage medium, comprising a set of instructions for browsing trail identification, the set of instructions configured to direct at least one processor to perform acts of:
receiving a search query from a user device;
identifying a first potential browsing destination based on the received search query;
searching a plurality of links based on the first potential browsing destination, each of the plurality of links being associated with a respective destination;
for each destination, obtaining a respective probability that the user will view the destination and a respective similarity between the received search query and the destination, wherein obtaining the respective similarity comprises comparing a vector based upon the received search query with a vector based upon the destination;
based on a path-scoring function that incorporates the respective probability of each destination with the respective similarity of each destination, selecting a sequence of potential browsing destinations from the plurality of destinations as a browsing trail,
wherein the potential browsing destinations of the sequence are linked with one another from the first potential browsing destination to an end potential browsing destination through at least one intermediate potential browsing destination;
wherein each of the first potential browsing destination and the at least one intermediate potential browsing destination comprises a link connecting to a next potential browsing destination in the sequence; and
providing a link associated with one of the at least one intermediate potential browsing destination to the user device for display by the user device in response to the received search query.

18. The storage medium of claim 17, wherein each of the end potential browsing destination and the at least one intermediate potential browsing destination comprises a link connecting to a previous potential browsing destination in the sequence.

19. The storage medium of claim 17, wherein the searching of at least one link of the plurality of links comprises:
searching at least one level down from the first potential browsing destination to identify the link, wherein the at least one level down corresponds with a page that can be reached from a search result from the search query.

20. The storage medium of claim 17, incorporating the respective probability of each destination with the respective similarity of each destination comprises weighting the respective similarity of each destination and adding the weighted respective similarity of each destination to the respective probability of each destination.

* * * * *